United States Patent
Rhee et al.

(10) Patent No.: US 9,454,839 B2
(45) Date of Patent: Sep. 27, 2016

(54) METHOD AND APPARATUS FOR EXPRESSING RIGID AREA BASED ON EXPRESSION CONTROL POINTS

(75) Inventors: Tae Hyun Rhee, Yongin-si (KR); Seon Min Rhee, Seoul (KR); Yong Beom Lee, Seoul (KR); Do Kyoon Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 13/335,461

(22) Filed: Dec. 22, 2011

(65) Prior Publication Data

US 2013/0002669 A1 Jan. 3, 2013

(30) Foreign Application Priority Data

Jun. 30, 2011 (KR) .......................... 10-2011-0064292

(51) Int. Cl.
*G06T 17/00* (2006.01)
*G06T 13/40* (2011.01)

(52) U.S. Cl.
CPC .................................... *G06T 13/40* (2013.01)

(58) Field of Classification Search
None
See application file for complete search history.

(56) References Cited

U.S. PATENT DOCUMENTS

| | | | |
|---|---|---|---|
| 6,480,190 B1* | 11/2002 | Pfister et al. ................. | 345/419 |
| 2005/0190962 A1* | 9/2005 | Liu et al. ...................... | 382/154 |
| 2006/0290693 A1* | 12/2006 | Zhou et al. ................... | 345/420 |
| 2008/0136814 A1* | 6/2008 | Chu et al. ..................... | 345/419 |
| 2009/0153552 A1 | 6/2009 | Fidaleo et al. | |
| 2009/0153554 A1* | 6/2009 | Lim et al. ..................... | 345/419 |
| 2009/0295793 A1 | 12/2009 | Taylor et al. | |

FOREIGN PATENT DOCUMENTS

| | | | |
|---|---|---|---|
| CN | 101826217 A | * | 9/2010 |
| JP | 06-282627 | | 10/1994 |
| KR | 10-2005-0103244 | | 10/2005 |
| KR | 10-2007-0057997 | | 6/2007 |
| KR | 10-2008-0018575 | | 2/2008 |
| KR | 10-2009-0075860 | | 7/2009 |
| KR | 10-2010-0044549 | | 4/2010 |
| WO | WO 2009030636 A1 | * | 3/2009 |

* cited by examiner

*Primary Examiner* — Kee M Tung
*Assistant Examiner* — Yi Wang
(74) *Attorney, Agent, or Firm* — NSIP Law

(57) ABSTRACT

A method and apparatus for expressing a rigid area based on expression control points that express a motion change of the rigid area with respect to an input expression. The method and apparatus express the rigid area by interpolating a change of expression of an avatar using a weight applied to an expression vector related to a plurality of expression samples to express the input expression and also using a transformation matrix set corresponding to the rigid area of each of the plurality of expression samples.

20 Claims, 6 Drawing Sheets

METHOD AND APPARATUS FOR EXPRESSING RIGID AREA BASED ON EXPRESSION CONTROL POINTS

CROSS-REFERENCE TO RELATED APPLICATIONS

This application claims the priority benefit of Korean Patent Application No. 10-2011-0064292, filed on Jun. 30, 2011, in the Korean Intellectual Property Office, the disclosure of which is incorporated herein by reference.

BACKGROUND

1. Field

Example embodiments of the following description relate to a method and apparatus for expressing a rigid area based on expression control points, and more specifically, to a method and apparatus to interpolate a change of expression of an avatar with respect to an input expression, using a weight and a transformation matrix, which correspond to a rigid area of each of a plurality of expression samples.

2. Description of the Related Art

In producing an avatar, a face is a significant factor that represents characteristics and various pieces of information of a person corresponding to the avatar. In particular, eyes and a mouth are a most influential parts for delivering emotions and words. That is, the eyes and mouth play an important role in expressing emotions and words of a 3-dimensional (3D) avatar. However, general animation technologies have been focusing on motions of a facial shape. Therefore, motions of eyes and a jaw with teeth have been produced and controlled by manual operations of artists. The eyes and the jaw with teeth are rigid objects, different from a facial skin. Therefore, when those rigid objects are controlled in the same manner as the facial skin, characteristics of the rigid objects are not preserved and unnatural curvature or distortion may be caused.

SUMMARY

The foregoing and/or other aspects are achieved by providing a method for expressing a rigid area based on expression control points, the method including generating a pose vector to express an input expression; calculating a weight applied to an expression vector related to a plurality of expression samples so as to express the input expression, based on the pose vector; interpolating a change of expression of an avatar corresponding to the input expression using the weight and a transformation matrix corresponding to a rigid area of each of the plurality of expression samples; and expressing a motion change of the rigid area with respect to the input expression based on a face mesh related to the input expression.

The generating of the pose vector may generate the pose vector based on the expression control points related to the input expression.

The method may further include maintaining an avatar pose database (DB) containing the expression vector representing the plurality of expression samples expressing a plurality of expressions of the avatar, and a plurality of transformation matrices used for expressing the plurality of expression samples.

The method may further include setting the transformation matrix corresponding to the rigid area of each of the plurality of expression samples.

The setting of the transformation matrix may set the transformation matrix containing a 3-dimensional (3D) position, rotation, enlargement and reduction with respect to the rigid area of each of the plurality of expression samples.

The method may further include generating the face mesh to control the avatar using the expression control points related to the input expression.

The interpolating of the change of expression of the avatar may include calculating an interpolation function, representing correlations between the expression vector and a position of the rigid area, based on the position of the rigid area of each of the plurality of expression samples.

The rigid area may include at least one of eyes and a jaw.

The foregoing and/or other aspects are achieved by providing an apparatus for expressing a rigid area based on expression control points, the apparatus including a generation unit to generate a pose vector for expressing an input expression; a calculation unit to calculate a weight applied to an expression vector related to a plurality of expression samples so as to express the input expression, based on the pose vector; an interpolation unit to interpolate a change of expression of an avatar corresponding to the input expression using the weight and a transformation matrix corresponding to a rigid area of each of the plurality of expression samples; and an expressing unit to express a motion change of the rigid area with respect to the input expression based on a face mesh related to the input expression.

The generation unit may generate the pose vector based on the expression control points related to the input expression.

The apparatus may further include an avatar pose database (DB) containing the expression vector representing the plurality of expression samples that express a plurality of expressions of the avatar, and a plurality of transformation matrices used for expressing the plurality of expression samples.

The apparatus may further include a set unit to set the transformation matrix corresponding to the rigid area of each of the plurality of expression samples.

The set unit may set the transformation matrix containing a 3D position, rotation, enlargement and reduction with respect to the rigid area of each of the plurality of expression samples.

The apparatus may further include a mesh generation unit to generate a face mesh for controlling the avatar using the expression control points related to the input expression.

The interpolation unit may further include a function calculator to calculate an interpolation function representing correlations between the expression vector and a position of the rigid area based on the position of the rigid area of each of the plurality of expression samples.

The rigid area may include at least one of eyes and a jaw.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
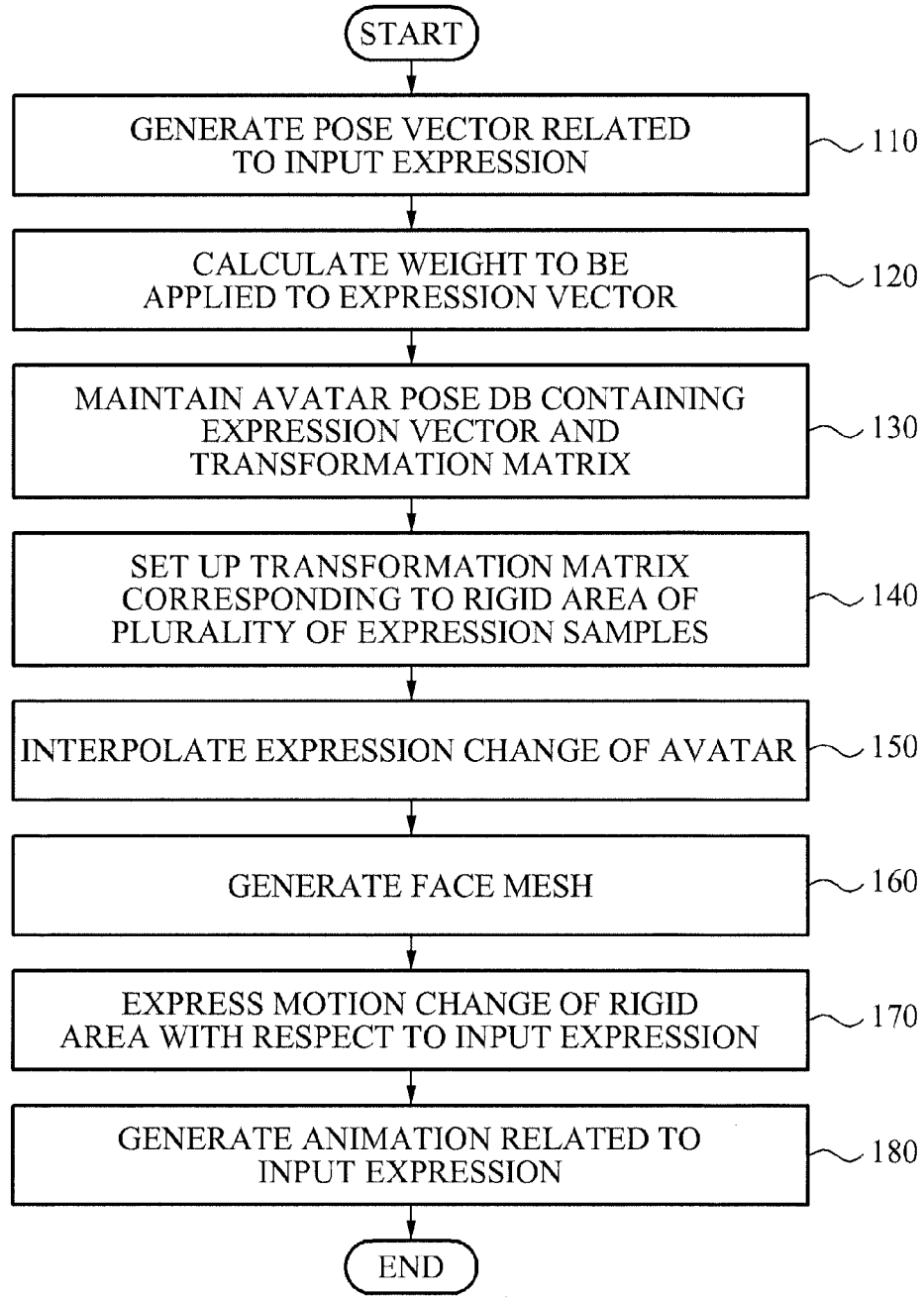
FIG. 1 illustrates a flowchart showing a method for expressing a rigid area based on expression control points, according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a flowchart showing a method for expressing a rigid area based on expression control points, according to example embodiments.

An apparatus for expressing a rigid area based on expression control points (hereinafter, referred to as "expressing apparatus") may generate a pose vector for expressing an input expression in operation 110. Since the pose vector is based on 3-dimensional (3D) avatar control coordinates for controlling a 3D avatar, the 3D avatar control coordinates will be denoted by expression control points hereinafter. The expression control points may be extracted from feature points of a face, the feature points extracted by vision. The feature points refer to distinctive spots on a face of a person to distinguish the person from other persons. For example, the feature points may include positions or coordinates of eyes, a nose, a mouth, a forehead, and eyebrows.

Before generating the pose vector, the expressing apparatus may set correlations between the feature points and the expression control points, using vertices of a face mesh and the feature points. Here, the face mesh may be a mesh configured to control an avatar corresponding to a user face.

The expressing apparatus may perform modeling such that vertices selected to control an animation from the vertices of the face mesh, that is, the expression control points may be matched with the feature points one to one in the same number and shape. Next, the expressing apparatus may perform labeling of the vertices.

The expression control points on the face mesh refer to control points for expressing various facial expressions. Various emotional expressions such as smiling, crying, frowning, anger, sulking, and blank expressions of the avatar corresponding to the user face may be controlled by adjusting positions of the expression control points.

The expressing apparatus may generate a transformation matrix for setting correlations between the feature points and the expression control points, using three vertices designated between eyebrows and at a nose, among the feature points and the expression control points.

The expressing apparatus may transfer the feature points to coordinates on the face mesh through global affine transformation using the transformation matrix.

The expressing apparatus may convert the coordinates of the feature points into the expression control points on the face mesh, based on the correlations between the feature points and the expression control points. That is, the expressing apparatus may perform the conversion to express, on the avatar, an expression of the user face indicated by the coordinates of the feature points.

The expressing apparatus may define a mapping function between the feature points and the expression control points, using the correlations. The expressing apparatus may convert the coordinates of the feature points into the expression control points on the face mesh, by calculating positions of vertices related to a random image frame using the mapping function. For example, a radial basis function may be used as the mapping function between the feature points and the expression control points.

The expressing apparatus may generate the pose vector capable of expressing a plurality of expressions of the avatar, based on the expression control points related to the input expression.

In operation 120, based on the pose vector, the expressing apparatus may calculate a weight applied to an expression vector related to a plurality of expression samples so as to express the input expression.

In this case, the expressing apparatus may denote the pose vector as a weighted sum of the expression vector and calculate the weight for the pose vector. Later, the expressing apparatus may interpolate a change in the input expression by blending the transformation matrix in a pose space of the avatar into the weight calculated in operation 120.

In operation 130, the expressing apparatus may maintain an avatar pose database (DB) containing the pose vector that expresses the plurality of expression samples and the transformation matrix used for expressing the plurality of expression samples. The avatar pose DB may contain a plurality of information including realistic expressions of the avatar or main expressions of the avatar, the main expressions for expressing a motion change of a rigid area, such as eyes or a jaw with teeth, in the realistic expressions.

Figure 2:
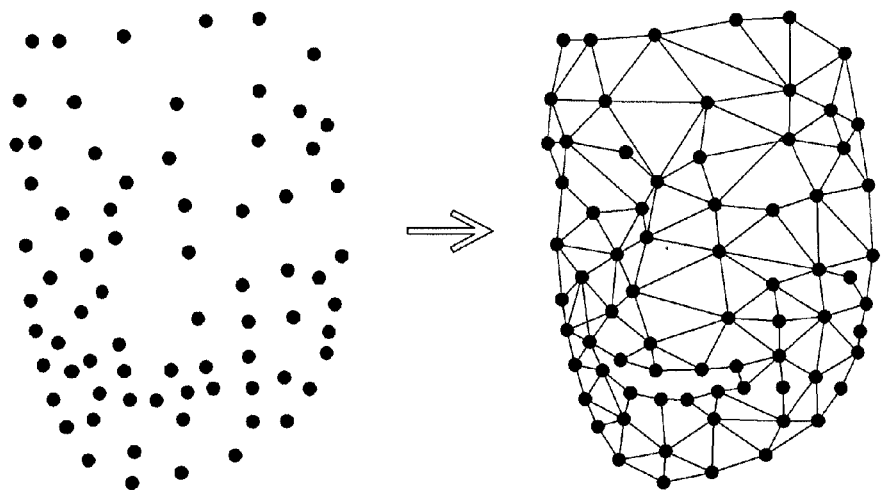
FIG. 2 illustrates an expression vector expressing expression samples according to example embodiments.

The pose vector expressing the plurality of expression samples may be a group of representative vertices of the expression of an avatar, or a graph connecting the vertices. FIG. 2 shows an example of the expression vector expressing the plurality of expression samples related to the avatar.

In operation 140, the expressing apparatus may set the transformation matrix corresponding to the rigid area of each of the plurality of expression samples. That is, transformation may be set up according to the respective expressions in operation 140. For example, to express a smiling expression, the expressing apparatus needs to change coordinates of expression control points, which express a mouth outline, a jaw position, a degree of a mouth opening, and the like, corresponding to a mouth or the jaw with teeth in the smiling expression. Accordingly, in operation 140, the expressing apparatus may set the transformation matrix indicating a degree of change necessary for the expression control points to express each of the plurality of expression samples.

In this case, the transformation matrix set by the expressing apparatus may contain a 3D position, rotation, enlargement and reduction related to the rigid area. The rigid area may include at least one of the eyes and the jaw with teeth. A method for setting a transformation matrix corresponding to the eyes, according to the plurality of expression samples will be described with reference to FIG. 3. In addition, a method for setting a transformation matrix corresponding to the jaw with teeth, according to the plurality of expression samples will be described with reference to FIG. 4.

In operation 150, the expressing apparatus may interpolate a change of expression of an avatar corresponding to the input expression using the weight and the transformation matrix corresponding to the rigid area of each of the plurality of expression samples. The expressing apparatus may interpolate the change of expression with respect to the input expression, by blending the transformation matrix in the avatar pose space using the weight calculated in operation 120.

Based on a position of the rigid area of each of the plurality of expression samples, the expressing apparatus may calculate an interpolation function representing correlations between the expression vector and the position of the rigid area. The expressing apparatus may generate a converted pose vector by interpolating changes of the respective expression samples in the avatar pose space, using the weight calculated in operation 120. For example, a pose space interpolation function using a radial basis function as shown in Equation 1 below may be used as the interpolation function.

For example, a method for generating an interpolation function with respect to the eyes, based on the avatar pose DB, may be performed in the following manner.

Figure 3:
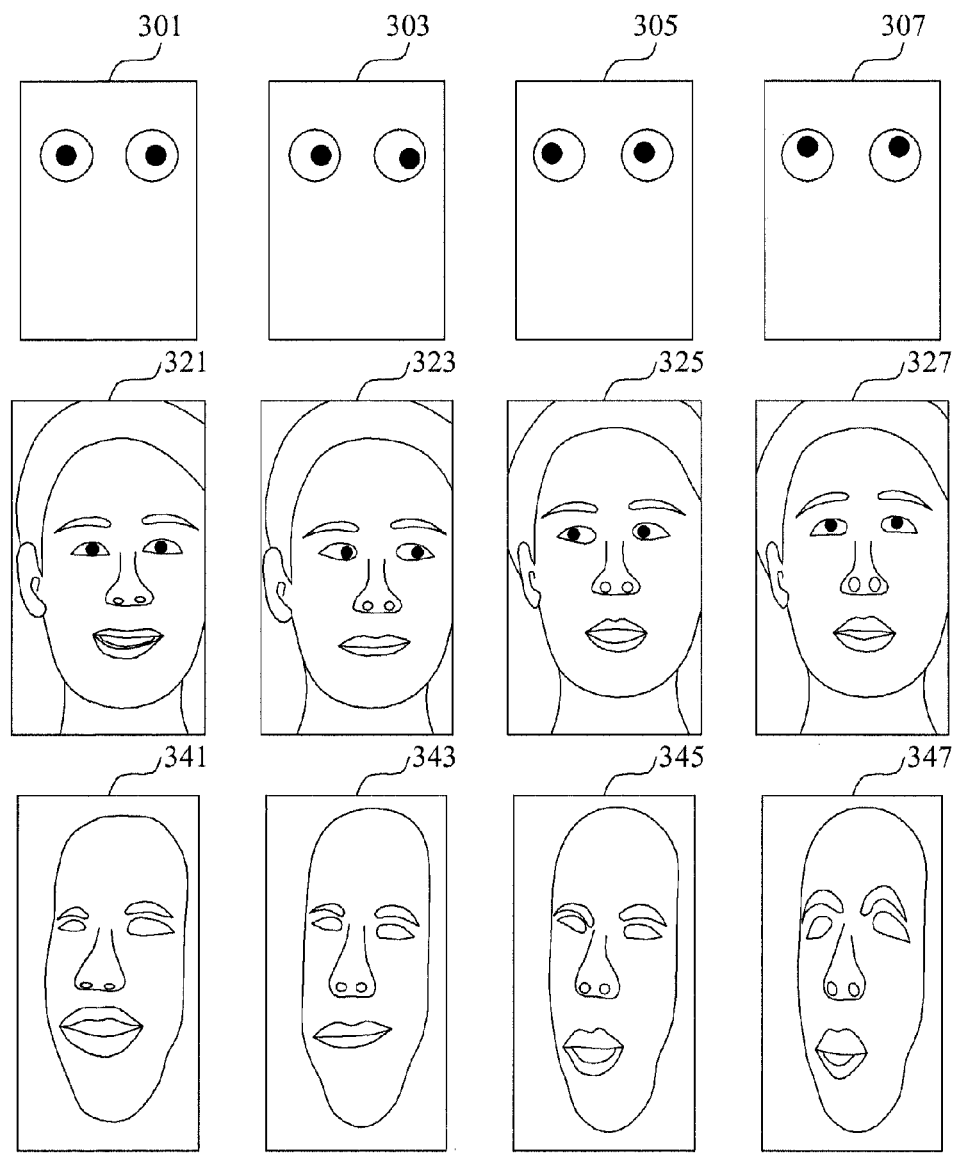
FIG. 3 illustrates a process of setting a transformation matrix corresponding to eyes according to a plurality of expression samples, according to example embodiments.

When eye positions are provided with respect to the plurality of expression samples as shown in FIG. 3, correlations between the expression vector representing the respective expressions, as shown in FIG. 2, and the eye positions may be obtained. For example, the correlation between the expression vector and the eye positions may be obtained using a scattered interpolation method, as shown in Equation 1 below.

$$t_i = \sum_{i=1}^{N_{sample}} \lambda_i \phi(|P_j - P_i|) \quad \text{[Equation 1]}$$

Here, $P_j$ denotes an expression vector with respect to an expression sample j, $P_i$ denotes an expression vector with respect to an expression sample i, and $t_i$ denotes a matrix or vector for transforming eyes of a basic expression to eyes of the expression sample $P_i$. Here, the basic expression may be a blank expression or any other facial expression easily distinguishable from various changed expressions. In addition, $\lambda_i$ denotes a weight applied to each expression vector to accurately express a fine expression, wrinkle, motion, and the like of the avatar.

When an $N_{sample}$-number of $P_i$, $P_j$, and $t_i$ are provided, the expressing apparatus may calculate the weight $\lambda_i$ through a linear system using ($P_i$, $P_j$, $t_i$). Here, $\phi$ denotes a Kernel function. For example, a Gaussian function may be used as the Kernel function.

In addition, an example method for generating an interpolation function with respect to the jaw, based on the avatar pose DB, will be described hereinafter.

Figure 4:
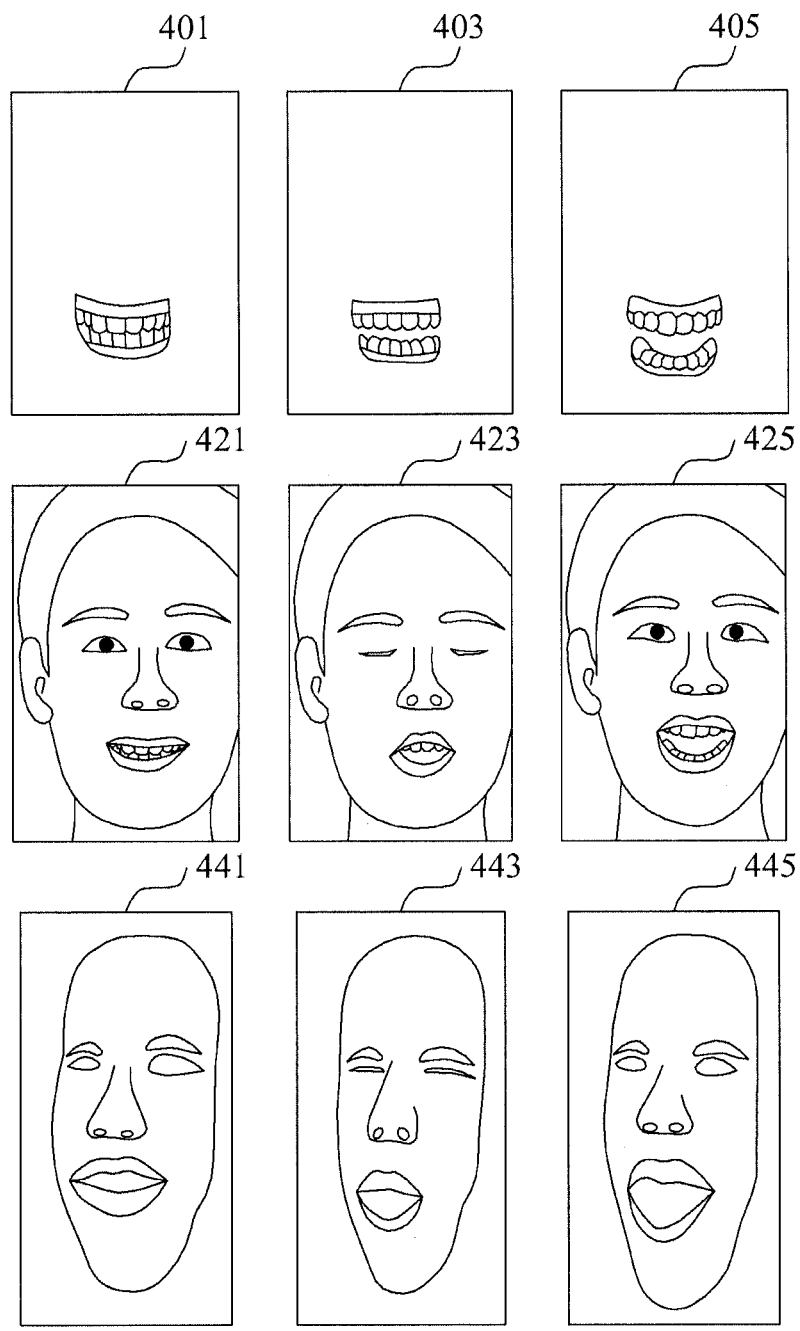
FIG. 4 illustrates a process of setting a transformation matrix corresponding to a jaw with teeth according to a plurality of expression samples, according to example embodiments.

When a jaw position is provided with respect to the plurality of expression samples, as shown in FIG. 4, correlations between the expression vectors representing the respective expressions (refer to FIG. 2) and the eye positions may be obtained by the scattered interpolation method. Here, in the same manner as the case of the eyes, the expressing apparatus may use Equation 1 to obtain the correlations between the expression vector and the jaw position. In this case, however, $t_i$ denotes a matrix or vector for transforming a jaw of the basic expression to a jaw of the expression sample $P_i$.

In operation 160, the expressing apparatus may generate the face mesh for controlling the avatar, using the expression control points related to the input expression.

More specifically, in operation 160, the expressing apparatus may generate an initially transformed mesh, that is, the face mesh, by a mesh transformation method that smoothly transforms a mesh while reflecting the positions of the expression control points as much as possible, using the expression control points and a smoothness limit based mesh optimization algorithm.

The expressing apparatus may perform the operation of generating the face mesh at any time from operation 110 to operation 150 as far as before operation 170, without being specifically limited.

In operation 170, the expressing apparatus may express a change in motion of the rigid area with respect to the input expression, based on the face mesh related to the input expression.

Figure 5:
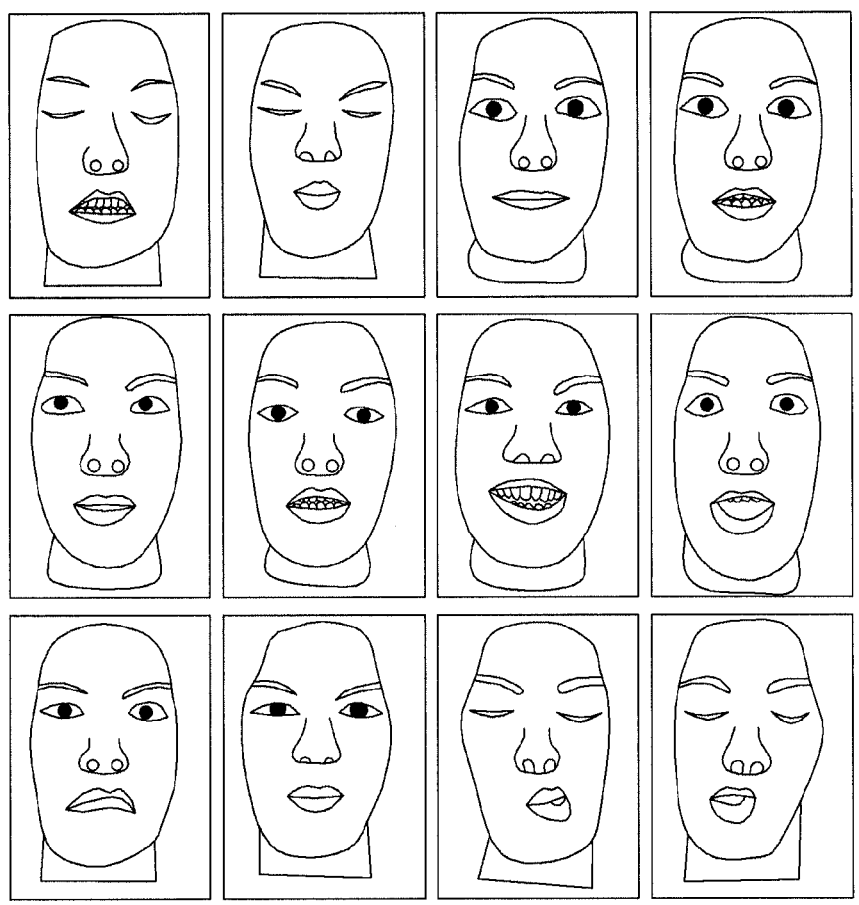
FIG. 5 illustrates a result of generating animation regarding eyes and a jaw with teeth, according to example embodiments.

More specifically, in operation 170, the expressing apparatus may obtain a transformed position of the eyes with respect to the random certain input expression, using the interpolation function. Here, the interpolation function may be calculated in operation 150. For example, the expressing apparatus may obtain the transformed position of the eyes using a radial basis function as shown in Equation 2 below, and generate an animation related to the eyes as shown in FIG. 5.

$$f(t_0 : P_a) = \sum_{i=1}^{N_{sample}} \lambda_i \phi(|P_a - P_i|), t : R^P \to R^T \quad \text{[Equation 2]}$$

Here, $t_0$ denotes a basic matrix or vector related to a reference position of the eyes or the teeth (or the jaw). The expressing apparatus may indicate a displacement degree of the eyes or the teeth of a random expression $P_a$ with respect to the basic matrix or vector.

$P_a$ refers to an expression vector with respect to the random input expression. $P_i$ refers to an expression vector with respect to the expression sample i. In addition, t: $R^P \to R^T$ means that a multi-dimensional vector including the plurality of expression samples, that is, a pose space $R^P$ may be converted to a transformation space $R^T$ by the expressing apparatus.

In the same manner as the case of the eyes, a transformed position of the jaw with respect to the random expression $P_a$ may be obtained using the interpolation function calculated in operation 150. Also, animation related to the jaw may be generated through Equation 2, as shown in FIG. 5.

FIG. 2 illustrates an expression vector expressing expression samples according to example embodiments.

When a human face or other body parts are to be implemented in a 3D space, the human face or body parts may be expressed as a 3D object. For example, in the 3D space, a plurality of lines and a plurality of points, that is, the feature points, constitute a polygon, and a plurality of the polygons constitute the 3D object of the human face. Therefore, motion of the 3D object may be achieved by transforming the respective polygons or changing coordinates of the points constituting the polygons.

A left diagram of FIG. 2 illustrates points, that is, the feature points, related to any one expression sample, such as a smiling expression, among various expressions. A right diagram of FIG. 2 illustrates an expression vector related to the any one expression sample.

As aforementioned, a weight may be applied to the expression vector shown in the right diagram of FIG. 2 to transform the polygons of the 3D object or changing the coordinates of the points constituting the polygons, thereby implementing various expressions.

FIG. 3 illustrates an example embodiment of a process of setting a transformation matrix corresponding to eyes, according to a plurality of expression samples.

For example, presuming that a plurality of expression samples 321, 323, 325, and 327 are provided as shown in FIG. 3, the expressing apparatus may set transformation matrices 341, 343, 345, and 347 corresponding to eyes 301, 303, 305, and 307, respectively, of the plurality of expression samples 321, 323, 325, and 327.

In this case, each of the transformation matrices may be expressed as a matrix or vector containing a 3D position, rotation, and enlargement and reduction of the eyes.

FIG. 4 illustrates an example embodiment of a process of setting a transformation matrix corresponding to a jaw with teeth according to a plurality of expression samples.

For example, presuming that a plurality of expression samples 421, 423, and 425 are provided, as shown in FIG. 4, the expressing apparatus may set transformation matrices 441, 443, and 445 corresponding to eyes 401, 403, and 405 respectively of the plurality of expression samples 421, 423, and 425.

In case of the jaw including teeth, a jaw model may be divided into an upper part and a lower part with respect to the jaw. Only the lower part may be moved while the upper part is fixed to the face mesh. The transformation matrix may be expressed as a matrix or vector containing a 3D position, rotation, and enlargement and reduction with respect to the jaw.

FIG. 5 illustrates a result of generating animation regarding eyes and a jaw with teeth, according to example embodiments.

The expressing apparatus may obtain a transformed position of the eyes or the jaw with teeth with respect to the random input expression, using a radial basis function, as in Equation 2, described in the foregoing, for example, and generate an animation related to the eyes or the jaw with teeth as shown in FIG. 5. The expressing apparatus may generate various animation results of the eyes or the jaw with teeth as shown in FIG. 5.

Figure 6:
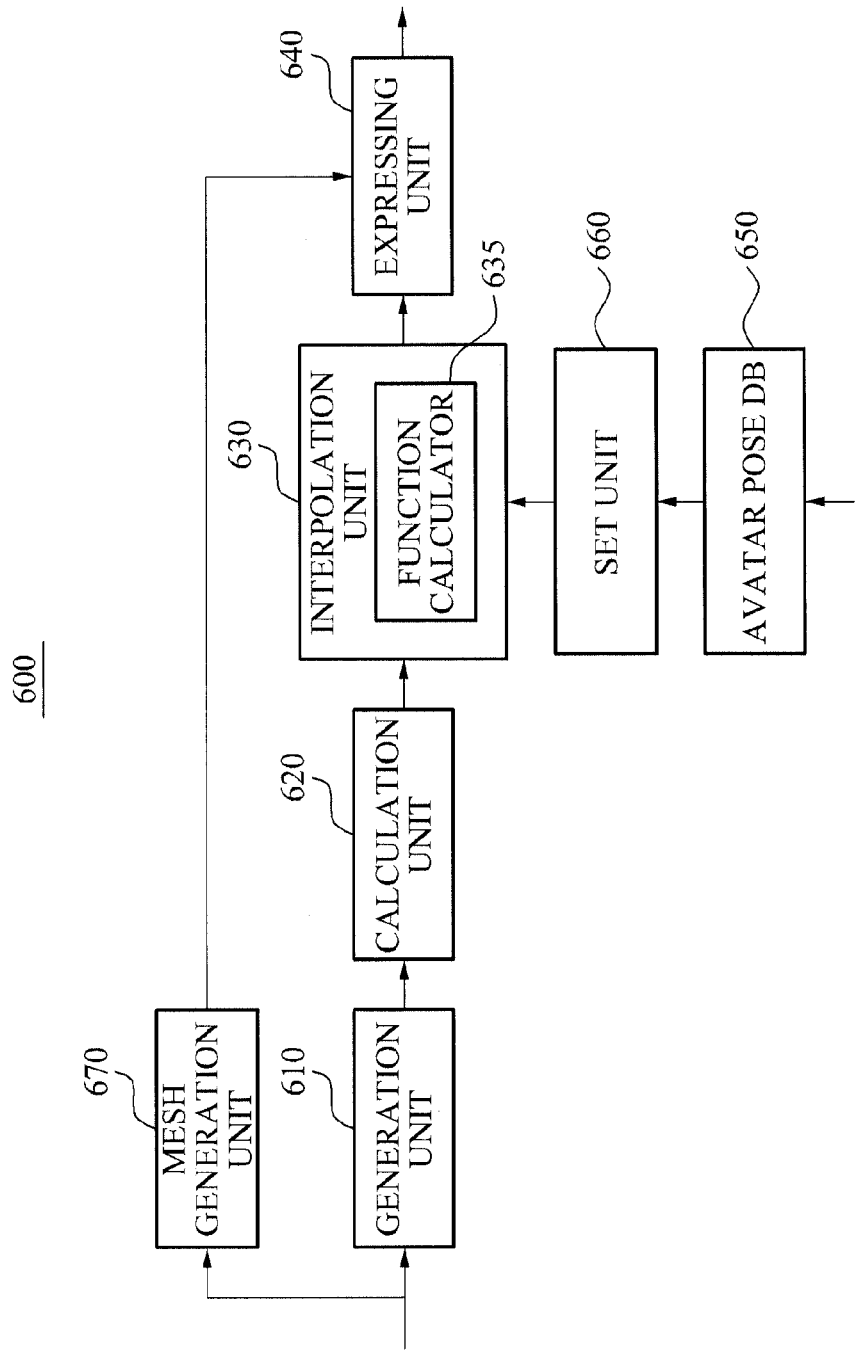
FIG. 6 illustrates a rigid area expressing apparatus based on expression control points, according to example embodiments.

FIG. 6 illustrates a rigid area expressing apparatus 600 based on expression control points, according to example embodiments.

The rigid area expressing apparatus (hereinafter, referred to as "expressing apparatus") 600 based on the expression control points may be a computer and may include a generation unit 610, a calculation unit 620, an interpolation unit 630, and an expressing unit 640. The expressing apparatus 600 may further include an avatar pose DB 650, a set unit 660, and a mesh generation unit 670.

The generation unit 610 may generate a pose vector capable of expressing an input expression. The generation unit 610 may generate the pose vector based on the expression control points related to a random input expression.

The calculation unit 620 may calculate a weight to be applied to an expression vector related to a plurality of expression samples to express the input expression, based on the pose vector.

The interpolation unit 630 may interpolate a change of expression of an avatar with respect to the input expression, using the weight and a transformation matrix corresponding to a rigid area of each of the plurality of expression samples. The rigid area may include at least one of eyes and a jaw with teeth.

In addition, the interpolation unit 630 may further include a function calculator 635 for calculating an interpolation function representing correlations between the expression vector and a position of the rigid area, based on the position of the rigid area of each of the plurality of expression samples.

The expressing unit 640 may express a motion change of the rigid area with respect to the input expression, based on a face mesh related to the input expression.

The avatar pose DB 650 may contain the expression vector expressing the plurality of expression samples of the avatar, and the transformation matrix used for expressing the plurality of expression samples.

The set unit 660 may set a transformation matrix corresponding to the rigid area of each of the plurality of expression samples. Here, the transformation matrix may contain a 3D position, rotation, and enlargement and reduction of the rigid area.

The mesh generation unit 670 may generate the face mesh for controlling the avatar using the expression control points related to the input expression.

According to the example embodiments, a pose vector related to an expression of a user, generated based on expression control points, and a transformation matrix related to a rigid area, such as, eyes and a jaw with teeth may be used. Therefore, motion of the rigid area may be more naturally expressed.

According to the example embodiments, only the motion of the eyes and teeth may be expressed using the transformation matrix, without changing shapes of eyes and teeth which are the rigid area. As a result, the rigid area of a face may be more naturally expressed.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. The media may be transfer media such as optical lines, metal lines, or waveguides including a carrier wave for transmitting a signal designating the program command and the data construction. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Further, according to an aspect of the embodiments, any combinations of the described features, functions and/or operations can be provided.

Moreover, the expressing apparatus 600, as shown in FIG. 6, may include at least one computer processor to execute at least one of the above-described units and methods.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A method for expressing a rigid area corresponding to an input expression, the method comprising:
   generating, by a processor, a pose vector to express the input expression;
   calculating weights applied to expression vectors related to a plurality of expression samples, based on the generated pose vector, wherein the expression vectors represent the plurality of expression samples expressing a plurality of expressions of an avatar;
   calculating a transformation matrix of the rigid area by applying the calculated weights to transformation matrices related to the plurality of expression samples,
   wherein each of the transformation matrices indicates a degree of change between expression control points of a rigid area of the corresponding expression sample and expression control points of a rigid area of a basic expression and the transformation matrices are used for expressing the plurality of expression samples; and
   expressing the rigid area based on the calculated transformation matrix and the basic expression, wherein the expression vectors and the transformation matrices are stored in an avatar pose database (DB).

2. The method of claim 1, further comprising:
   setting correlations between feature points and expression control points related to the input expression, using vertices of a face mesh related to the input expression and the feature points.

3. The method of claim 1, wherein the generating of the pose vector generates the pose vector based on expression control points related to the input expression.

4. The method of claim 1, further comprising:
   setting a transformation matrix corresponding to the rigid area of each of the plurality of expression samples.

5. The method of claim 4, wherein the setting of the transformation matrix sets the transformation matrix containing a 3-dimensional (3D) position, rotation, enlargement and reduction with respect to the rigid area of each of the plurality of expression samples.

6. The method of claim 1, further comprising:
   generating a face mesh to control an avatar using expression control points related to the input expression.

7. The method of claim 1, wherein the calculating the transformation matrix comprises:
   calculating an interpolation function representing correlations between the expression vectors and a position of the rigid area of each of the plurality of expression samples.

8. The method of claim 1, wherein the rigid area comprises at least one of eyes and a jaw.

9. The method of claim 1, further comprising:
   defining a mapping function between feature points and the expression control points of the rigid area of the corresponding expression sample; and
   converting coordinates of the feature points into the expression control points of the rigid area of the corresponding expression sample on a face mesh, by calculating positions of vertices related to a random image frame using the mapping function.

10. A non-transitory computer-readable recording medium storing a program for instructing a computer to implement the method of claim 1.

11. The method of claim 1, wherein a motion of the rigid area is expressed using the transformation matrix, without changing a shape of the rigid area.

12. An apparatus for expressing a rigid area corresponding to an input expression, the apparatus comprising:
   a processor comprising:
   a generation unit to generate a pose vector for expressing the input expression;
   a calculation unit to calculate weights applied to expression vectors related to a plurality of expression samples, based on the generated pose vector, wherein the expression vectors represent the plurality of expression samples expressing a plurality of expressions of an avatar;
     an interpolation unit to calculate a transformation matrix of the rigid area by applying the calculated weights to transformation matrices related to the plurality of expression samples,
     wherein each of the transformation matrices indicates a degree of change between expression control points of a rigid area of the corresponding expression sample and expression control points of a rigid area of a basic expression and the transformation matrices are used for expressing the plurality of expression samples; and
     an expressing unit to express the rigid area based on the calculated transformation matrix and the basic expression, wherein the expression vectors and the transformation matrices are stored in an avatar pose database (DB).

13. The apparatus of claim 12, wherein correlations are set between feature points and expression control points related to the input expression, using vertices of a face mesh related to the input expression and the feature points.

14. The apparatus of claim 12, wherein the generation unit generates the pose vector based on expression control points related to the input expression.

15. The apparatus of claim 12, further comprising a set unit to set a transformation matrix corresponding to the rigid area of each of the plurality of expression samples.

16. The apparatus of claim 15, wherein the set unit sets the transformation matrix containing a 3-dimensional (3D) position, rotation, enlargement and reduction with respect to the rigid area of each of the plurality of expression samples.

17. The apparatus of claim 12, further comprising a mesh generation unit to generate a face mesh for controlling an avatar using expression control points related to the input expression.

18. The apparatus of claim 12, wherein the interpolation unit further comprises a function calculator to calculate an interpolation function representing correlations between the expression vectors and a position of the rigid area of each of the plurality of expression samples.

19. The apparatus of claim 12, wherein the rigid area comprises at least one of eyes and a jaw.

20. The apparatus of claim 12, wherein the apparatus defines a mapping function between feature points and the expression control points of the rigid area of the corresponding expression sample and converts coordinates of the feature points into the expression control points of the rigid area of the corresponding expression sample on a face mesh, by calculating positions of vertices related to a random image frame using the mapping function.

* * * * *